Feb. 23, 1932. P. E. DIEDERICH 1,846,587
CLOSURE FOR APERTURED RECEPTACLES
Filed April 25, 1929
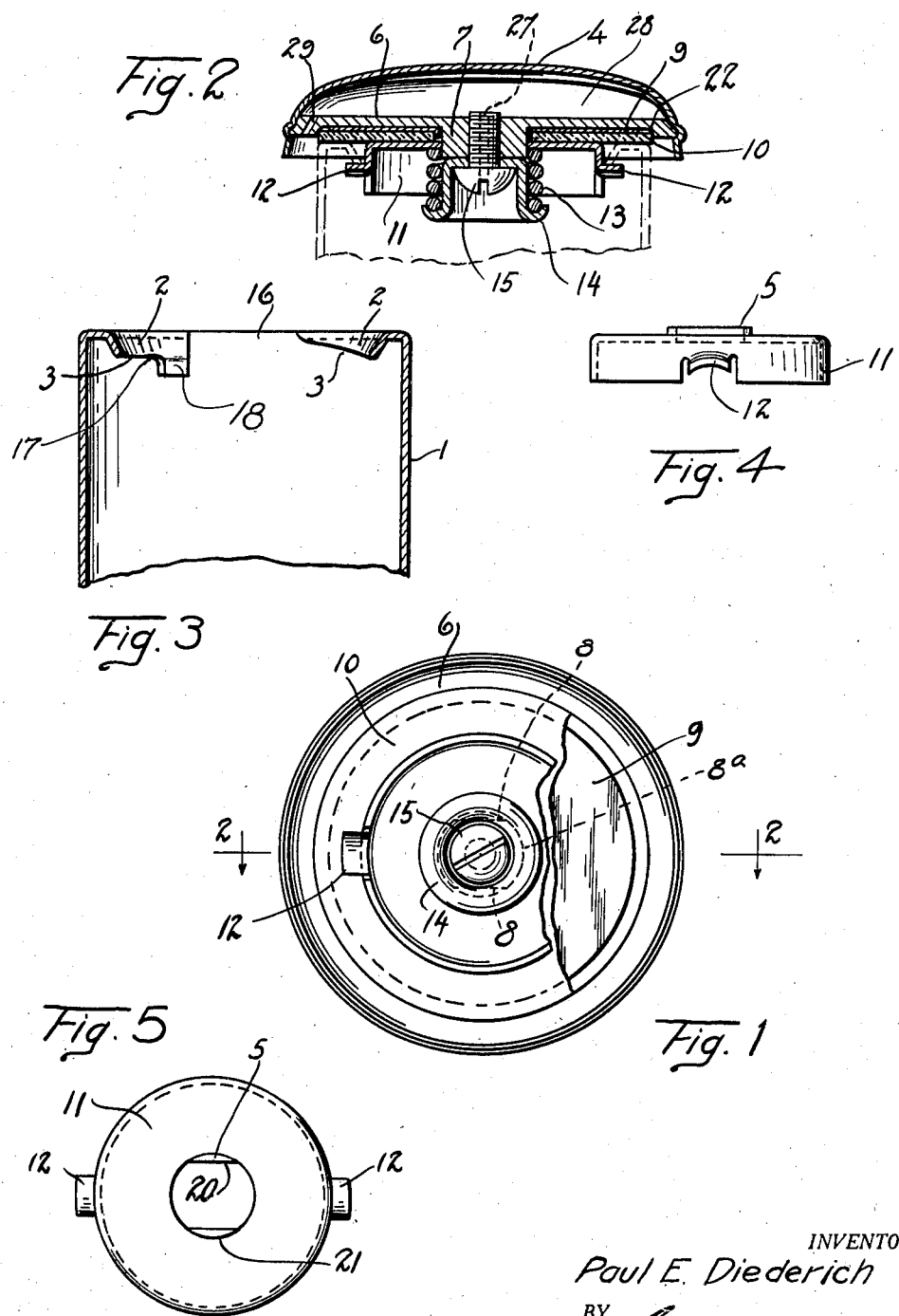
INVENTOR.
Paul E. Diederich
BY
ATTORNEY.

Patented Feb. 23, 1932

1,846,587

UNITED STATES PATENT OFFICE

PAUL E. DIEDERICH, OF DETROIT, MICHIGAN, ASSIGNOR TO STANDARD TUBE AND MANUFACTURING COMPANY, OF DETROIT, MICHIGAN, A CORPORATION OF MICHIGAN

CLOSURE FOR APERTURED RECEPTACLES

Application filed April 25, 1929. Serial No. 357,913.

This invention relates to a closure for apertured receptacles and more particularly to a closure for a filler tube.

In order to effect a liquid proof seal between the cap and the filler tube mouth, it is common to interpose between the cap and the mouth a suitable sealing member preferably in the form of a deformable gasket of any suitable substance such as rubber. In the type of closure wherein the cap turns onto the filler tube, this type of gasket, owing to its high-co-efficient of friction, sticks either to the cap or to the filler tube and consequently is chewed and otherwise worn away with the consequent decrease in its effectiveness as a sealing member. In order to obviate this undesirable feature of this type of gasket, it is the object of this invention to interpose between the gasket and the cap, a slippage member which will allow the cap to freely rotate relative to the gasket while the cap is being turned on without wearing or chewing away the gasket.

In the drawings:

Fig. 1 is a bottom plan view of the closure partly broken away.

Fig. 2 is a section on the line 2—2 of Fig. 1.

Fig. 3 is a section through the filler tube showing the internal cam surfaces.

Fig. 4 is a perspective of the adjusting cup with the struck-out locking fingers.

Fig. 5 is a top plan view of the adjustable cup viewed as positioned in Fig. 2.

Referring more particularly to the drawings, the filler tube may be designated 1 and has the internal depending flanges 2 with the cam surfaces 3, the shallow notches 17 and the locking finger stops 18.

The closure includes the stamped metal cap 4 which has fixed therein the baffle 6. The baffle 6 has a depending or projecting pilot 7 with the flat sides 8 and rounded sides 8a. A metal disc 9 having a central circular aperture for the pilot 7 is mounted in rotatable relation to the pilot 7 and in slidable relation to the baffle 6. This disc is made of any suitable metal such as steel or copper which will readily slip or rotate upon the under surface of the metal baffle 6. Any suitable lubricant may be fed between the disc and the baffle. The rubber gasket 10 has a central circular aperture for the pilot 7 and engages the under surface of the disc 9. The rubber gasket is held in position by the adjustable cup 11 which has struck therein the locking fingers 12 and the lugs 5. The lugs 5 each have a flat face 20 and a rounded face 21 the curvature of which is the same as that of the round faces 8 of pilot 7. The lugs 5 are fitted with their flat faces against the flat faces 8 of the pilot thereby composing with the pilot 7 a cylinder about which the rubber will readily rotate.

The adjustable cup 11 has a central aperture which conforms with the cross sectional shape of the pilot 7, and hence is in non-rotatable relation with the baffle 6 and the cap 4. The adjustable cup 11 is held in position by the coil spring 13 which encircles the pilot 7 and which in turn is held in position by the spring retainer 14 which is adjustably secured to the pilot 7 by means of the tension adjusting screw 15 which has a threaded engagement in the pilot.

To secure the cap to the filler tube, the locking fingers 12 are positioned in the recesses 16 and the cap is turned which causes the locking fingers to slidably engage the cam surfaces 3, which engagement draws the cap and gasket 10 downward into tight sealed relation with the filler tube. While the cap is being turned, the coil spring 13 permits the cup 11 to slide up or down on the pilot 7 owing to the sliding engagement of the locking fingers with the cam surfaces 3 and this eases the increase in tension between the fingers and the cam surfaces sufficiently to permit the cap to be turned completely on till the locking fingers engage in the shallow notches 17 and abut against the finger stops 18.

By adjusting the tension screw 15 the pressure with which the locking fingers 12 engage the cam surfaces 3 and the pressure exerted by the baffle on the gasket may be varied. It is evident that the less the tension between the cam surfaces 3 and the locking fingers 12 that the easier it will be to turn the cap onto the filler tube. In other words the ease with which the closure may be turned on or off the filler tube can be adjusted by turning the tension screw 15.

The cam engagement between the locking fingers and the cam surfaces cause the baffle 6 to press the gasket 10 into frictional engagement with the mouth of the filler tube. Since the frictional engagement between the baffle and the slippage disc 9 is very small compared to the friction between the filler tube and the gasket 10, therefore when the cap is turned on, the gasket 10 will remain in fixed relation with the filler tube whereas the baffle will rotate upon the slippage disc 9 which slippage disc will be held stationary owing to its frictional engagement with the gasket.

It will be noted that the disc 9 has a smaller diameter than the gasket 10 which permits a portion 22 of the gasket to project beyond the circumference of the disc 9. This circumferential extension 22 of the gasket 10 is not sufficient to effect an appreciable frictional engagement with the baffle 6 and serves as a seal to prevent leakage of any of the liquid which may seep through the joint between the pilot 7 and the gasket 9, and thence out through the joints between the gasket, disc, and baffle.

Some uses require that the closure have air vents. Hence, the tension screw has a bore 27 which opens into the chamber 28 between the baffle 6 and cap 4. The chamber 28 communicates with the atmosphere through the air vent 29 in the baffle 6. This arrangement of vents is such as to render fuel oil losses through the air vents substantially nil. It is also to be noted that the rubber gasket is entirely insulated from the fuel oil which, as is well known, hastens the deterioration of rubber.

It is evident that there is here produced a closure for a filler tube which may be readily and easily turned into position without chewing away or wearing the gasket.

Claims:

1. A closure for apertured receptacles having in combination, a cap arranged to have a bayonet engagement with said receptacle to close the aperture, means for effecting a seal between the cap and the receptacle, and a thin metal disc interposed between and engaging substantially throughout the disc surface the said cap and the said sealing means which permits the cap to turn while the sealing means remains stationary on the receptacle.

2. A closure for apertured receptacles having in combination, a cap arranged to have a bayonet engagement with the said receptacle to close the aperture, means for initially effecting a seal between the cap and the receptacle, and means for interposing a slippage surface between the said cap and sealing means where the cap presses the sealing means against the receptacle.

3. A closure for apertured receptacles having in combination, a cap arranged to have a bayonet engagement with said receptacle to close the aperture, means for initially effecting a seal between the cap and the receptacle, and a second means rotatively mounted within the cap for interposing a surface having a relatively low co-efficient of friction between the said cap and the said sealing means where the cap presses the sealing means against the receptacle.

In testimony whereof I affix my signature.

PAUL E. DIEDERICH.